(12) United States Patent
Inoue et al.

(10) Patent No.: US 10,704,777 B2
(45) Date of Patent: Jul. 7, 2020

(54) FLUORESCENT LIGHT SOURCE DEVICE AND PRODUCTION PROCESS OF SAME

(71) Applicant: Ushio Denki Kabushiki Kaisha, Tokyo (JP)

(72) Inventors: Masaki Inoue, Tokyo (JP); Kiyoyuki Kabuki, Tokyo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/470,930

(22) PCT Filed: Dec. 26, 2017

(86) PCT No.: PCT/JP2017/046671
§ 371 (c)(1),
(2) Date: Jun. 18, 2019

(87) PCT Pub. No.: WO2018/124082
PCT Pub. Date: Jul. 5, 2018

(65) Prior Publication Data
US 2019/0338937 A1    Nov. 7, 2019

(30) Foreign Application Priority Data
Dec. 28, 2016  (JP) .................................. 2016-254931

(51) Int. Cl.
*F21V 29/502*    (2015.01)
*F21V 9/32*    (2018.01)
(Continued)

(52) U.S. Cl.
CPC .......... *F21V 29/502* (2015.01); *B23K 1/0008* (2013.01); *B32B 18/00* (2013.01);
(Continued)

(58) Field of Classification Search
CPC ..... F21V 9/30; F21V 9/32; F21V 9/38; F21V 19/042; F21V 19/045; F21V 29/502;
(Continued)

(56) References Cited

U.S. PATENT DOCUMENTS

2012/0057364 A1    3/2012 Kishimoto et al.
2012/0119638 A1*   5/2012 Sato ...................... H01L 33/644
                                                              313/46
(Continued)

FOREIGN PATENT DOCUMENTS

JP    2011-129354 A    6/2011
JP    2012-142188 A    7/2012
(Continued)

OTHER PUBLICATIONS

Machine Translation of JP 2013-187043 (Year: 2013).*
(Continued)

*Primary Examiner* — Prashant J Khatri
*Assistant Examiner* — Zachary M Davis
(74) *Attorney, Agent, or Firm* — Studebaker & Brackett PC

(57) ABSTRACT

The present invention has as its object the provision of a fluorescent light source device capable of stably obtaining high luminous efficiency and a production process of the same.
The fluorescent light source device of the present invention includes a fluorescent plate which has a fluorescent light-emitting layer formed of a polycrystalline material and in which a periodic structure body is formed on an excitation light incident side of the fluorescent light-emitting layer. The fluorescent plate has a thermal diffusion layer which is directly bonded to a front surface of the fluorescent light-emitting layer on the excitation light incident side and has a thermal conductivity larger than that of the fluorescent
(Continued)

light-emitting layer, and a high thermal conductive layer provided on a back surface of the fluorescent light-emitting layer opposite to the excitation light incident side. The high thermal conductive layer is formed of a light reflection layer and a bonding layer made of a metal, and the fluorescent plate is provided so as to cover a part of a surface of a heat dissipation substrate disposed on a side of the high thermal conductive layer side.

27 Claims, 2 Drawing Sheets

(51) Int. Cl.
  *B23K 1/00* (2006.01)
  *B32B 18/00* (2006.01)
  *B23K 103/00* (2006.01)
(52) U.S. Cl.
  CPC ............ *F21V 9/32* (2018.02); *B23K 2103/52* (2018.08); *B32B 2307/422* (2013.01); *B32B 2551/00* (2013.01)
(58) Field of Classification Search
  CPC . F21V 29/503; F21K 9/00; F21K 9/64; F21K 99/00; F21S 2/00; H01L 23/3736; H01L 27/3232; H01L 31/0232; H01L 31/02322; H01L 2224/08175; H01L 2224/08245; H01L 2224/085; H01L 2224/08501
  See application file for complete search history.

(56) References Cited

U.S. PATENT DOCUMENTS

| 2014/0140071 A1* | 5/2014 | Daicho | C09K 11/715 362/317 |
| 2015/0115278 A1* | 4/2015 | Ichikawa | H01L 33/22 257/76 |
| 2016/0077415 A1 | 3/2016 | Motoya et al. | |

FOREIGN PATENT DOCUMENTS

| JP | 2013-187043 A | 9/2013 |
| JP | 2015-138136 A | 7/2015 |
| JP | 2015-195098 A | 11/2015 |
| JP | 2016-058619 A | 4/2016 |

OTHER PUBLICATIONS

Machine Translation of JP 2011-129354 (Year: 2011).*
Oates, "Welding Handbook", 1996, American Welding Society, p. 391 (Year: 1996).*
International Search Report issued in PCT/JP2017/046671; dated Feb. 20, 2018.
Office Action issued in JP 2016-254931; mailed by the Japanese Patent Office dated Jun. 5, 2018.
The extended European search report issued by the European Patent Office dated Jan. 22, 2020, which corresponds to European Patent Application No. 17888896.2-1015 and is related to U.S. Appl. No. 16/470,930.

* cited by examiner

_FLUORESCENT LIGHT SOURCE DEVICE AND PRODUCTION PROCESS OF SAME_

TECHNICAL FIELD

The present invention relates to a fluorescent light source device including a fluorescent plate that emits fluorescence by excitation light and a production process of the same.

BACKGROUND ART

Conventionally, as a fluorescent light source device, there has been a known device with a configuration in which a fluorescent material is irradiated with laser light as excitation light, and the fluorescent material emits fluorescence.

As shown in FIG. 4, a certain type of such a fluorescent light source device includes a flat plate-shaped fluorescent plate 51 composed of a fluorescent material, and an excitation light source 11 for irradiating excitation light to the fluorescent plate 51 (see, for example, Patent Literature 1). The fluorescent plate 51 is disposed on a heat dissipation substrate 31 via a bonding portion 52 formed of an organic adhesive, an inorganic adhesive, a low-melting point glass, a metal braze, or the like. The heat dissipation substrate 31 has a function of dissipating heat from the fluorescent plate 51 to the outside, and also has a function of serving as a reflection surface and a function of holding the fluorescent plate 51. In the fluorescent plate 51, a surface opposite to the bonding surface with the heat dissipation substrate 31 serves as an excitation light incident surface as well as a fluorescence emission surface, a partial region of the excitation light incident surface (specifically, a central region thereof) serves as an excitation light irradiation region, and the excitation light irradiation region and a peripheral region thereof serve as a fluorescence emission region.

However, in such a reflection type fluorescent light source device, there is a problem that the fluorescent plate is heated by the irradiation of the excitation light to increase the temperature of the fluorescent plate, and as a result, temperature quenching occurs in the fluorescent material in the fluorescent plate, and so a sufficient fluorescent light flux (fluorescent light quantity) cannot be obtained.

The reason why the temperature of the fluorescent plate becomes high will be described. In the fluorescent plate, since the fluorescent material converts a part of the light energy into heat energy upon receipt of excitation light, heat is generated by irradiation with the excitation light. In the fluorescent plate, in particular, an adjacent portion immediately below the excitation light irradiation region on the excitation light incident surface, that is, a surface layer portion relating to the excitation light irradiation region on the excitation light incident surface side, becomes extremely high in temperature. However, since the heat dissipation substrate is disposed on the surface side opposite to the excitation light incident surface, heat generated in the fluorescent plate cannot be sufficiently discharged by the heat dissipation substrate, and therefore, temperature quenching occurs in the fluorescent plate.

Such a problem becomes conspicuous when the incident power of the excitation light (excitation energy of the excitation light) is large. That is, a sufficient fluorescent light flux cannot be obtained as compared to the incident power of the excitation light.

As another configuration of the fluorescent light source device, there is a configuration in which a flat plate-shaped fluorescent plate composed of a fluorescent material is bonded to a light-transmissive substrate with an adhesive or the like, one surface of the fluorescent plate, which is the bonding surface with the light-transmissive substrate, serves as an excitation light incident surface, and the other surface, which is a surface opposite to the bonding surface with the light-transmissive substrate, serves as a fluorescence emission surface. That is, in the fluorescent plate, one surface is irradiated with the excitation light through the light-transmissive substrate, and the fluorescence is emitted from the other surface. In such a transmission type fluorescent light source device, the light-transmissive substrate has thermal conductivity, and is connected to a cooling block made of metal.

However, even in such a fluorescent light source device, there is a problem that a sufficient fluorescent light flux cannot be obtained because the temperature of the fluorescent plate increases.

CITATION LIST

Patent Literature

Patent Literature 1: Japanese Patent Application Laid-Open No. 2011-129354

SUMMARY OF INVENTION

Technical Problem

The present invention has been made in view of the foregoing circumstances, and has as its object the provision of a fluorescent light source device capable of stably obtaining high luminous efficiency and a production process of the same.

Solution to Problem

The fluorescent light source device of the present invention includes a fluorescent plate which has a fluorescent light-emitting layer formed of a polycrystalline material and in which a periodic structure body is formed on an excitation light incident side of the fluorescent light-emitting layer, the fluorescent plate has a thermal diffusion layer which is directly bonded to a front surface of the fluorescent light-emitting layer on the excitation light incident side and has a thermal conductivity larger than that of the fluorescent light-emitting layer, and a high thermal conductive layer provided on a back surface of the fluorescent light-emitting layer opposite to the excitation light incident side, the high thermal conductive layer is formed of a light reflection layer and a bonding layer made of a metal, and the fluorescent plate is provided so as to cover a part of a surface of a heat dissipation substrate disposed on a side of the high thermal conductive layer.

In the fluorescent light source device of the present invention, it is preferable that a material for forming the fluorescent light-emitting layer and a material for forming the thermal diffusion layer contain $Al_2O_3$, and that a difference in coefficient of linear thermal expansion between the material for forming the fluorescent light-emitting layer and the material for forming the thermal diffusion layer is not more than $1 \times 10^{-6}$/K.

In such a fluorescent light source device, it is preferable that the material for forming the fluorescent light-emitting layer is a polycrystalline material of $Al_2O_3$ and an inorganic fluorescent material.

In addition, it is preferable that the fluorescent light-emitting layer has an exposed area ratio of $Al_2O_3$ of not less than 50% in a bonding surface with the thermal diffusion layer.

Further, it is preferable that the material for forming the thermal diffusion layer is sapphire.

In the fluorescent light source device of the present invention, it is preferable that the material for forming the high thermal conductive layer has a higher thermal conductivity than that of the material for forming the fluorescent light-emitting layer.

In the fluorescent light source device of the present invention, it is preferable that the material for forming the high thermal conductive layer has a higher thermal conductivity than that of the material for forming the thermal diffusion layer.

In the fluorescent light source device of the present invention, when the thickness of the thermal diffusion layer is t [m] and the thermal conductivity of the material for forming the thermal diffusion layer is λ [W/(m·K)], it is preferable that a value of a reciprocal (1/(t×λ)) of a product of the thickness and the thermal conductivity of the material for forming the thermal diffusion layer satisfies 10 to 350 (K/W).

The production process of the fluorescent light source device of the present invention is a method for producing the aforementioned fluorescent light source device in which the material for forming the fluorescent light-emitting layer and the material for forming the thermal diffusion layer include $Al_2O_3$, includes:

preparing a fluorescent light-emitting layer material having a surface which is to be bonded to the thermal diffusion layer and has a surface roughness of not less than 0.01 nm and not more than 1 nm, and a thermal diffusion layer material having a surface which is to be bonded to the fluorescent light-emitting layer and has a surface roughness of not less than 0.01 nm and not more than 1 nm; and a step of bonding the fluorescent light-emitting layer material and the thermal diffusion layer material to each other by heating to 800 to 1200° C. in a state where surfaces of them are in close contact with each other.

Advantageous Effects of Invention

In the fluorescent light source device of the present invention, the fluorescent plate has the thermal diffusion layer on the excitation light incident side of the fluorescent light-emitting layer, has the high thermal conductive layer on the side opposite to the excitation light incident side, and is provided so as to cover a part of the surface of the heat dissipation substrate disposed on the high thermal conductive layer side. Therefore, even when heat is locally generated in the adjacent portion immediately below the partial region of the fluorescent light-emitting layer on the one surface on the side where the excitation light is incident by the excitation light incident on the partial region, the heat is diffused by being transferred to the thermal diffusion layer, and is efficiently transferred to the heat dissipation substrate through the peripheral portion of the immediately below-adjacent portion and the high thermal conductive layer. That is, in the fluorescent light-emitting layer, a heat discharge path extending from the thermal diffusion layer toward the high thermal conductive layer is formed in the peripheral portion of the portion where heat is generated by the incident excitation light. Therefore, even when the heat dissipation substrate is disposed on the side opposite to the excitation light incident side of the fluorescent light-emitting layer, heat generated in the fluorescent light-emitting layer by irradiation with the excitation light can be efficiently transferred to the heat dissipation substrate and discharged. As a result, it is possible to suppress the occurrence of temperature quenching in the fluorescent light-emitting layer.

Therefore, according to the fluorescent light source device of the present invention, even when the incident power of the excitation light (excitation energy of the excitation light) is large, it is possible to suppress the occurrence of temperature quenching in the fluorescent light-emitting layer, and so a high fluorescence luminous flux (fluorescent light quantity) can be obtained, and as a result, it is possible to stably obtain a high luminous efficiency.

In addition, according to the configuration in which the material for forming the fluorescent light-emitting layer and the material for forming the thermal diffusion layer contain $Al_2O_3$ and the difference in the coefficient of linear thermal expansion thereof is not more than $1\times10^{-6}$/K, a fluorescent plate having a high bonding strength between the fluorescent light-emitting layer and the thermal diffusion layer can be obtained by heat treatment at 800 to 1200° C., for example.

DESCRIPTION OF EMBODIMENTS

An embodiment of a fluorescent light source device of the present invention will be described below.

Figure 1:
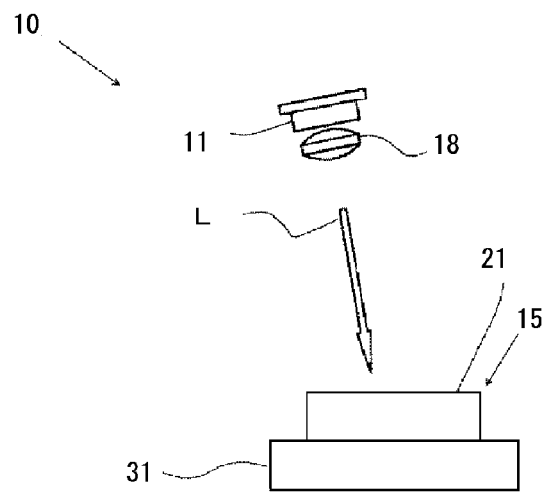
FIG. 1 is an explanatory diagram illustrating an outline of a configuration in an example of a fluorescent light source device of the present invention.

FIG. 1 is an explanatory diagram illustrating an outline of a configuration in an example of a fluorescent light source device of the present invention.

As shown in FIG. 1, the fluorescent light source device 10 includes an excitation light source 11 formed of, for example, a laser diode, and a substantially flat plate-shaped fluorescent light-emitting member 15 having a fluorescent plate 21 which emits fluorescence when excited by excitation light L emitted from the excitation light source 11, and these members are disposed apart from each other. The fluorescent light-emitting member 15 is disposed in an inclined posture, for example, with respect to the optical axis of the excitation light source 11 so as to face the excitation light source 11. A collimator lens 18 that outputs the incident excitation light L as parallel light is disposed at a position close to the excitation light source 11 between the excitation light source 11 and the fluorescent light-emitting member 15.

Figure 2:
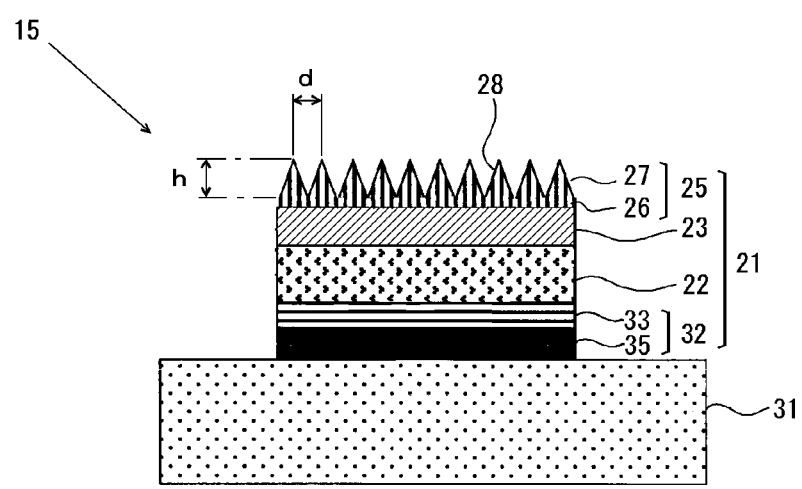
FIG. 2 is an explanatory diagram illustrating a configuration of a fluorescent light-emitting member in the fluorescent light source device of FIG. 1.

In the fluorescent light-emitting member 15, as illustrated in FIG. 2, the substantially flat plate-shaped fluorescent plate 21 is disposed on the front surface (the upper surface in FIG. 2) of the flat plate-shaped heat dissipation substrate 31.

The fluorescent light-emitting member 15 is provided with a heat dissipation member (not shown) made of metal such as copper on the back surface of the heat dissipation substrate 31.

The fluorescent plate 21 has a flat plate-shaped fluorescent light-emitting layer 22, a flat plate-shaped thermal diffusion layer 23 directly bonded on the front surface (the upper surface in FIG. 2) of the fluorescent light-emitting layer 22, and a substantially flat plate-shaped periodic structure body layer 25 laminated on the thermal diffusion layer 23. The front surface (the upper surface in FIG. 2) of the periodic structure body layer 25 serves as an excitation light incident surface as well as a fluorescence emission surface. A periodic structure body 27 in which a plurality of convex portions 28 are periodically arranged is formed on the front surface of the periodic structure body layer 25.

Further, in the fluorescent plate 21, a light reflection layer 33 formed of a light reflection film is provided on the back surface (the lower surface in FIG. 2) of the fluorescent light-emitting layer 22. Further, a bonding layer 35 made of metal is provided on the back surface (the lower surface in FIG. 2) of the light reflection layer 33, and the fluorescent plate 21 is bonded onto the heat dissipation substrate 31 by the bonding layer 35. A high thermal conductive layer 32 is constituted by a laminate of the light reflection layer 33, in contact with the fluorescent light-emitting layer 22, and the bonding layer 35. That is, the fluorescent plate 21 has the high thermal conductive layer 32 composed of the light reflection layer 33 and the bonding layer 35 on the side opposite to the excitation light incident side of the fluorescent light-emitting layer 22.

In the example illustrated in this figure, an excitation light irradiation region which is irradiated with excitation light L (laser light) that is emitted from the excitation light source 11 and collimated by the collimator lens 18 is formed on the excitation light incident surface of the fluorescent plate 21 (the surface of the periodic structure body layer 25) by a portion of the excitation light incident surface (specifically, the central region thereof). In addition, a fluorescence emission region is formed on the fluorescence emission surface of the fluorescent plate 21 (the front surface of the periodic structure body layer 25) by the excitation light irradiation region and a peripheral region thereof.

In the fluorescent plate 21, a material containing $Al_2O_3$ is preferably used as the material for forming the fluorescent emitting layer 22, and in particular, a material made of a polycrystalline material of $Al_2O_3$ and an inorganic fluorescent material is preferred.

The formation of the fluorescent light-emitting layer 22 using such materials can improve the thermal conductivity of the fluorescent light-emitting layer 22 itself. Therefore, in the fluorescent light-emitting layer 22, the heat generated by the irradiation of the excitation light is efficiently discharged, and so the high temperature state of the fluorescent light-emitting layer 22 is further suppressed. In addition, the degree of freedom in selecting the type of the inorganic fluorescent material in the fluorescent light-emitting layer 22 is increased from the viewpoint of the bonding strength between the fluorescent light-emitting layer 22 and the thermal diffusion layer 23.

Concerning the materials for forming the fluorescent light-emitting layer 22, as the usable inorganic fluorescent materials, may be mentioned YAG fluorescent materials such as YAG:Ce, YAG:Pr and YAG:Sm, (Y,Gd)AG:Ce, LuAG:Ce, CASN:Eu, Sialon:Eu, and the like. In such an inorganic fluorescent material, the doping amount of the activating material is preferably not more than 0.5 mol %.

Here, the fluorescence generated in the fluorescent light-emitting layer 22 is, for example, light having a peak wavelength of 520 to 650 nm.

In the example illustrated in this figure, a mixed sintered body of a YAG fluorescent material and $Al_2O_3$ in which the doping amount of the activating material is not more than 0.5 mol % is used as the polycrystalline material constituting the fluorescent light-emitting layer 22, for example.

The ratio of $Al_2O_3$ contained in the fluorescent light-emitting layer 22 is preferably 50 to 75%. Since $Al_2O_3$ is contained in such a ratio, heat generated in the fluorescent light-emitting layer 22 is efficiently discharged, and the fluorescent plate 21 having a high bonding strength between the fluorescent light-emitting layer 22 and the thermal diffusion layer 23 can be reliably obtained.

In case of the ratio of $Al_2O_3$ being less than 50%, when the surface of the fluorescent light-emitting layer material is polished prior to bonding a fluorescent light-emitting layer material to a thermal diffusion layer material, the inorganic fluorescent material is likely to be polished, and so a concave portion is formed on the surface, and it is sometimes difficult to obtain a satisfactory bonding area. As a result, in the obtained fluorescent plate 21, peeling and pores may occur between the fluorescent light-emitting layer 22 and the thermal diffusion layer 23. On the other hand, if the ratio of $Al_2O_3$ exceeds 75%, the excitation light L is hardly absorbed in the fluorescent light-emitting layer 22, and so the fluorescent light output may be lowered.

The material for forming the fluorescent light-emitting layer 22 preferably has a thermal conductivity of 10 to 13 W/(m·K) and a coefficient of linear thermal expansion of $5.8 \times 10^{-6}$ to $6.3 \times 10^{-6}$/K.

The thermal conductivity and the coefficient of linear thermal expansion of the material for forming the fluorescent light-emitting layer 22 can be controlled by the type of the inorganic fluorescent material, the ratio of the inorganic fluorescent material to $Al_2O_3$, and the like.

In addition, the fluorescent light-emitting layer 22 preferably has an exposed area ratio of $Al_2O_3$ of not less than 50% in the bonding surface with the thermal diffusion layer 23, and more preferably 50 to 75%. When the exposed area ratio of $Al_2O_3$ is not less than 50% or more, the fluorescent plate 21 having a higher bonding strength between the fluorescent light-emitting layer 22 and the thermal diffusion layer 23 can be more reliably obtained.

The exposed area ratio of $Al_2O_3$ in the bonding surface with the thermal diffusion layer 23 can be measured by cross-sectional composition analysis and SEM-imaging.

The thickness of the fluorescent light-emitting layer 22 is preferably 0.05 to 2.0 mm from the viewpoints of effective utilization of excitation light and heat dissipation properties.

The material for forming the thermal diffusion layer 23 has a thermal conductivity higher than that of the material for forming the fluorescent light-emitting layer 22, and has light transmittance to the excitation light L and the fluorescence (fluorescence emitted from the fluorescent material constituting the fluorescent light-emitting layer 22).

As a material for forming the thermal diffusion layer 23, a material containing $Al_2O_3$ is preferably used. In addition, it is preferable that the material for forming the thermal diffusion layer 23 is such that the difference between the coefficient of linear thermal expansion thereof and the coefficient of linear thermal expansion of the fluorescent light-emitting layer 22 is not more than $1 \times 10^{-6}$/K. By using such a material for forming the thermal diffusion layer 23, the obtained fluorescent plate 21 can have high bonding strength without voids between the fluorescent light-emitting layer 22 and the thermal diffusion layer 23 by heat treatment, which will be described later. Therefore, it is possible to prevent or sufficiently suppress the occurrence of peeling between the fluorescent light-emitting layer 22 and the thermal diffusion layer 23 caused by the irradiation with the excitation light to the fluorescent light-emitting member 15.

A preferable specific example of the material for forming the thermal diffusion layer 23 is sapphire (thermal conductivity=42 W/(m·K)).

In the thermal diffusion layer 23, when the thickness of the thermal diffusion layer 23 is represented by t [m] and the thermal conductivity of the material for forming the thermal diffusion layer 23 is represented by λ [W/(m·K)], the value of the reciprocal (1/(t×λ)) of the product of the thickness t and the thermal conductivity λ is preferably 10 to 350 K/W. Here, the "reciprocal (1/(t×λ)) of the product of the thickness t and the thermal conductivity λ" of the thermal diffusion layer 23 indicates the thermal resistance of the thermal diffusion layer 23, that is, the index of the thermal diffusion ability, and indicates that the smaller the value, the easier the heat is to be conducted.

If the value of the reciprocal (1/(t×λ)) of the product of the thickness t and the thermal conductivity λ is excessively large, sufficient thermal diffusivity (thermal conductivity) cannot be obtained in the thermal diffusion layer 23, and so temperature quenching occurs in the fluorescent material in the fluorescent light-emitting layer 22, and there is a possibility that a sufficient fluorescent light flux (fluorescent light quantity) cannot be obtained.

As a case in which the value of the reciprocal (1/(t×λ)) of the product of the thickness t and the thermal conductivity λ is too small, a case in which the thickness t of the thermal diffusion layer 23 is large may be considered. In such a case, particularly in the case where the thickness t is not less than 0.6 mm, the fluorescence emitted from the fluorescent material is guided in the direction along the thermal diffusion layer 23 (left-right direction in FIG. 2) and is emitted from the peripheral side surface of the thermal diffusion layer 23, and so there is a possibility that sufficient fluorescence output cannot be obtained in the light emitted from the fluorescence emission surface of the fluorescent plate 21. That is, there is a possibility that the fluorescence cannot be emitted with sufficiently high efficiency through the fluorescence emission surface of the fluorescent plate 21.

The thickness (maximum thickness) of the thermal diffusion layer 23 is determined in accordance with the thermal conductivity of the material for forming the thermal diffusion layer 23 as described above, but is preferably 0.03 to 0.6 mm from the viewpoint of effective utilization of excitation light and heat dissipation properties.

In addition, it is preferable that the area of the thermal diffusion layer 23 (specifically, the area of the back surface of the thermal diffusion layer 23) is the same as the area of the fluorescent light-emitting layer 22 (specifically, the area of the front surface of the fluorescent light-emitting layer 22) from the viewpoint of the thermal diffusivity of the thermal diffusion layer 23 and the effective utilization of the fluorescent light-emitting layer 22 (specifically, the utilization of the fluorescent light-emitting layer 22 as a heat discharge path).

In the example illustrated in this figure, the area of the back surface (the lower surface in FIG. 2) of the thermal diffusion layer 23 is equal to the area of the front surface of the fluorescent light-emitting layer 22. That is, the back surface of the thermal diffusion layer 23 has a length and width dimension equivalent to the length and width dimension of the front surface of the fluorescent light-emitting layer 22, and the peripheral side surface of the thermal diffusion layer 23 and the peripheral side surface of the fluorescent light-emitting layer 22 constitute a continuous surface without a step.

The periodic structure body layer 25 has light transmittance to excitation light L and fluorescence (fluorescence emitted from the inorganic fluorescent material constituting the fluorescent light-emitting layer 22), and the periodic structure body 27 in which a plurality of convex portions 28 are periodically arranged is provided on the front surface of the fluorescent plate 21 which is to be the excitation light incident surface and the fluorescence emission surface.

More specifically, the periodic structure body layer 25 is composed of a thin flat plate-shaped base portion 26 and the periodic structure body 27 formed on the base portion 26 and composed of a plurality of conical convex portions 28.

In the example illustrated in this figure, the periodic structure body 27 is formed by two-dimensionally and periodically arranging the convex portions 28 of a cone shape in a state in which they are densely arranged on the thin flat plate-shaped base portion 26 disposed so as to cover the entire surface of the thermal diffusion layer 23.

Since the periodic structure body 27 is provided on the excitation light incident side of the fluorescent plate 21, reflection of the excitation light L on the front surface of the periodic structure body layer 25, that is, on the front surface of the fluorescent plate 21 can be suppressed. Therefore, when the front surface of the periodic structure body layer 25 is irradiated with the excitation light L, the excitation light L can be sufficiently taken into the fluorescent plate 21. In addition, it is possible to suppress the excitation light L from being locally incident on the fluorescent light-emitting layer 22. Therefore, it is possible to suppress the fluorescent light-emitting layer 22 from becoming extremely high in temperature locally.

The periodic structure of the periodic structure body 27 has an aspect ratio h/d, which is a ratio of the height h of the convex portion 28 to the period d, of not less than 0.2, preferably 0.2 to 1.5, and particularly preferably 0.5 to 1.0.

Here, in the present invention, the period of the periodic structure means the center-to-center distance (nm) between the convex portions adjacent to each other in the periodic structure.

By setting the aspect ratio in the periodic structure of the periodic structure body 27 to be not less than 0.2, reflection of the excitation light L on the surface of the periodic structure body layer 25, that is, the front surface of the fluorescent plate 21 can be further suppressed. Therefore, when the surface of the periodic structure body layer 25 is irradiated with the excitation light L, the excitation light L can be sufficiently taken into the fluorescent plate 21.

Further, when the aspect ratio in the periodic structure is not less than 0.2, the fluorescence emitted from the fluorescent material constituting the fluorescent light-emitting layer 22 can be extracted to the outside from the surface of the periodic structure body layer 25, which serves as the fluorescence emission surface of the fluorescent plate 21, with high efficiency.

The material for forming the periodic structure body layer 25 is preferably an inorganic material because the energy for exciting the inorganic fluorescent material in the fluorescent light-emitting layer 22 has an excitation density of about not less than 5 W/mm$^2$.

As a specific example of the material for forming the periodic structure body layer 25, may be mentioned sapphire, silica, titania, zirconia and silicon nitride.

The thickness (maximum thickness) of the periodic structure body layer 25 is, for example, 0.1 to 1.0 μm.

The high thermal conductive layer 32 is formed of a laminate of the light reflection layer 33 and the bonding layer 35, and it is preferable that the thermal conductivity of the material for forming the high thermal conductive layer 32 is larger than the thermal conductivity of the material for forming the fluorescent light-emitting layer 22 (polycrystalline material) from the viewpoint of heat dissipation properties. Specifically, it is preferable that the thermal conductivity of the material for forming the light reflection layer 33 is larger than that of the material for forming the fluorescent light-emitting layer 22 (polycrystalline material), and the thermal conductivity of the material for forming the bonding layer 35 is larger than that of the material for forming the fluorescent light-emitting layer 22 (polycrystalline material).

In addition, it is preferable that the thermal conductivity of the material for forming the high thermal conductive layer 32 is larger than that of the material for forming the thermal diffusion layer 23 from the viewpoint of heat dissipation properties. Specifically, it is preferable that the thermal conductivity of the material for forming the light reflection layer 33 is larger than that of the material for forming the thermal diffusion layer 23, and the thermal conductivity of the material for forming the bonding layer 35 is larger than that of the material for forming the thermal diffusion layer 23.

The thermal conductivity of the material for forming the light reflection layer 33 is determined in consideration of the thermal conductivity of the material for forming the bonding layer 35 in accordance with the thermal conductivity of the material for forming the fluorescent light-emitting layer 22, the thermal conductivity of the material for forming the thermal diffusion layer 23, the thickness of the light reflection layer 33, and the like, and may preferably be 226 to 429 W/(m·K).

The thermal conductivity of the material for forming the bonding layer 35 is determined in consideration of the thermal conductivity of the material for forming the light reflection layer 33 in accordance with the thermal conductivity of the material for forming the fluorescent light-emitting layer 22, the thermal conductivity of the material for forming the thermal diffusion layer 23, the thickness of the bonding layer 35, and the like, and may preferably be 40 to 60 W/(m·K).

As a material for forming the light reflection layer 33, silver (thermal conductivity: 429 W/(m·K)) is preferably used from the viewpoint of thermal conductivity and reflectivity.

As a material for forming the bonding layer 35, from the viewpoint of thermal conductivity, metals such as solder (for example, a gold-tin (AuSn) alloy (Sn content ratio: 20% by mass, thermal conductivity: 60 W/(m·K)), lead (Pb, thermal conductivity: 49 W/(m·K)), a gold-germanium (AuGe) alloy (thermal conductivity: 44 W/(m·K)), or a silver sintered body (thermal conductivity: 429 W/(m·K)) may be used.

In the example illustrated in this figure, a reflection increased silver film is used as the light reflection film. Gold-tin (AuSn) solders are used as the bonding layer 35.

The thickness of the light reflection layer 33 in the high thermal conductive layer 32 is preferably 100 to 200 nm.

The thickness of the bonding layer 35 is preferably 5 to 30 µm.

As the heat dissipation substrate 31, a metal substrate formed of a material such as copper, an alloy of molybdenum and copper (Mo—Cu), and the like is used. The thickness of the heat dissipation substrate 31 is, for example, 0.5 to 5.0 mm. In addition, the aluminum substrate and the metal substrate constituting the heat dissipation substrate 31 may have a function of a heat dissipation fin.

Further, in the heat dissipation substrate 31, it is preferable that the area of the heat dissipation substrate 31 (specifically, the area of the front surface of the heat dissipation substrate 31) is the same as the area of the fluorescent plate 21 (specifically, the area of the back surface of the fluorescent plate 21) from the viewpoint of heat dissipation properties.

In the example illustrated in this figure, the area of the front surface of the heat dissipation substrate 31 is larger than that of the back surface of the fluorescent plate 21. That is, the front surface of the heat dissipation substrate 31 has a larger length and width dimension than that of the back surface of the fluorescent plate 21.

The fluorescent plate 21 is disposed on the front surface of the heat dissipation substrate 31 so as to cover a part of the front surface from the viewpoint of heat dissipation properties. That is, the fluorescent plate 21 is provided so as to cover a part of the front surface of the heat dissipation substrate.

In the example illustrated in this figure, the entire back surface of the fluorescent plate 21 is in opposing contact with the central region of the front surface of the heat dissipation substrate 31. That is, the central region of the front surface of the heat dissipation substrate 31 is covered with the fluorescent plate 21.

Such a fluorescent light-emitting member 15 can be produced, for example, in the following manner.

First, a fluorescent light-emitting layer material for obtaining the fluorescent light-emitting layer 22 and a thermal diffusion layer material for obtaining the thermal diffusion layer 23 are produced. The fluorescent light-emitting layer material is a material containing $Al_2O_3$, for example, a polycrystalline material of $Al_2O_3$ and an inorganic fluorescent material. The thermal diffusion layer material is a material containing $Al_2O_3$, for example, sapphire.

The polycrystalline material constituting the fluorescent light-emitting layer material can be obtained by, for example, the following method.

Raw materials (specifically, a base material, an activator, and a firing aid (specifically, silica ($SiO_2$)) and $Al_2O_3$) are pulverized using a ball mill or the like to obtain fine powder of raw materials of submicron or less. Then, the fine powder of raw materials obtained and an organic solvent are used to prepare a slurry in which the fine powder of raw materials is uniformly dispersed in the organic solvent.

Next, a compact is produced from the obtained slurry by a doctor blade method, and the compact is fired to obtain a sintered body. Thereafter, the obtained sintered body is subjected to hot isostatic pressing to obtain a polycrystalline material having a porosity of not more than 0.5%. The ratio of $Al_2O_3$ in the polycrystalline material is preferably not less than 50%, and particularly 50 to 75%.

The surface of each of the fluorescent light-emitting layer material and the thermal diffusion layer material bonded to each other is polished by chemical mechanical polishing (CMP) to obtain a smooth surface. Specifically, the surface roughness Ra (arithmetic mean roughness) of each surface of the fluorescent light-emitting layer material and the thermal diffusion layer material is preferably not less than 0.01 nm and not more than 1 nm, more preferably not less than 0.01 nm and not more than 0.5 nm, and particularly preferably not less than 0.01 nm and not more than 0.3 nm.

When the surface roughness Ra of the smooth surface of each of the fluorescent light-emitting layer material and the thermal diffusion layer material falls within the aforementioned range, the obtained fluorescent plate 21 can have a larger bonding strength between the thermal diffusion layer 23 and the fluorescent light-emitting layer 22. If the surface roughness Ra is excessively large, sufficient bonding strength may not be obtained between the thermal diffusion layer 23 and the fluorescent light-emitting layer 22.

Then, the fluorescent light-emitting layer material and the thermal diffusion layer material are heated to 800 to 1200° C. under an atmospheric pressure environment in a state in which the smooth surfaces thereof are in close contact with each other. As a result, there can be obtained a laminate in which the thermal diffusion layer 23 is directly bonded to the surface of the fluorescent light-emitting layer 22 by optical contact due to interaction of surface molecules of the respective smooth surfaces. According to such a method, since the fluorescent light-emitting layer 22 and the thermal diffusion layer are bonded by the surface intermolecular force regardless of the bonding member such as an adhesive, it is possible to obtain a high bonding strength between the fluorescent light-emitting layer 22 and the thermal diffusion layer 23.

The reason why the fluorescent light-emitting layer material and the thermal diffusion layer material are bonded is presumed as follows.

Since $Al_2O_3$ is contained in the thermal diffusion layer material and the fluorescent light-emitting layer material, hydroxyl groups (OH groups) exist on the smooth surfaces of the thermal diffusion layer material and the fluorescent light-emitting layer material, and therefore, when annealing is performed under the above-mentioned heating temperature conditions, the hydroxyl groups contribute to bonding of the smooth surfaces of the thermal diffusion layer material and the fluorescent light-emitting layer material to each other. In the process of bonding the fluorescent light-emitting layer material and the thermal diffusion layer material each having a smooth surface by optical contact, the fluorescent light-emitting layer material and the thermal diffusion layer material are superposed to perform temporary bonding, and then annealing treatment is performed. At this time, since the difference in thermal expansion coefficient between the fluorescent light-emitting layer material and the thermal diffusion layer material is not more than $1 \times 10^{-6}$/K, even if annealing is performed at the above-mentioned temperature range, peeling and generation of bubbles due to the difference in thermal expansion are small at the bonding interface. As a result, the thermal diffusion layer material and the fluorescent light-emitting layer material are bonded to each other with high strength.

In this configuration, when the heating temperature is less than 800° C., the bonding is performed only partially, and thus the void generation region is large. On the other hand, when the heating temperature exceeds 1200° C., degradation of the fluorescent material occurs, and so sufficient brightness cannot be obtained.

Next, the periodic structure body layer 25 is formed on the thermal diffusion layer 23.

As a method of forming the periodic structure body layer 25, a method in which a sol-gel method and a nanoimprint method are combined can be used. More specifically, a sol-like material containing an alkoxide of such as aluminum, silicon, titanium, or zirconium is applied to the surface of the thermal diffusion layer 23 by, for example, a spin coating method. Next, heat treatment is performed in a state in which a mold is pressed against the obtained coating film, and after releasing the mold, heat treatment is performed. By this heat treatment, the reaction (hydrolysis and condensation polymerization) proceeds, and so the periodic structure body layer 25 made of an inorganic material is formed.

The periodic structure body layer 25 may also be formed by using a nanoimprint method and a dry etching process. Specifically, a resist is applied to the surface of the flat plate-shaped inorganic material layer by, for example, a spin coating method, and then a coating film of the resist is patterned by, for example, a nanoimprint method. Thereafter, dry etching is performed to form the periodic structure body layer 25 formed of an inorganic material and having the periodic structure body 27 provided on the surface thereof.

The periodic structure may be formed directly on the thermal diffusion layer 23.

Next, on the back surface of the fluorescent light-emitting layer 22, the high thermal conductive layer 32 formed of a laminate of the light reflection layer 33 and the bonding layer 35 is formed.

In forming the light reflection layer 33 and the bonding layer 35, first, Ag or Al serving as the light reflection layer 33 is vapor-deposited on the fluorescent light-emitting layer 22 to form a reflective metal film. In order to prevent oxidation or sulfidation of the reflective metal film, a protective film is formed by vapor deposition or plating of Cr, Ni, or the like to form the light reflection layer 33. Then, the bonding layer 35 made of solder is formed on the protective film in the light reflection layer 33 to bond it to the heat dissipation substrate 31. As a result, the high thermal conductive layer 32 formed of a laminate of the light reflection layer 33 and the bonding layer 35 is obtained.

In the fluorescent light source device 10 described above, the excitation light L emitted from the excitation light source 11 is converted into a parallel light beam by the collimator lens 18. Thereafter, the excitation light L converted into parallel light is irradiated to the excitation light incident region of the excitation light incident surface (front surface of the periodic structure body layer 25) of the fluorescent plate 21 in the fluorescent light-emitting member 15, and is then incident on the region immediately below the excitation light incident region and the peripheral region of the immediately-below region (hereinafter, these are collectively referred to as "light incident central region") in the fluorescent light-emitting layer 22 via the periodic structure body layer 25 and the thermal diffusion layer 23. Then, in the fluorescent light-emitting layer 22, the fluorescent material is excited, whereby the fluorescent material emits fluorescence. This fluorescence is emitted from the fluorescence emission region of the fluorescence emission surface of the fluorescent plate 21 (the front surface of the periodic structure body layer 25) together with the excitation light L that has been reflected by the light reflection layer 33 without being absorbed by the fluorescent material, and is emitted to the outside of the fluorescent light source device 10.

In this configuration, when the light is incident on the light incident central region of the fluorescent light-emitting layer 22, the adjacent portion immediately below the light incident central region of the fluorescent light-emitting layer 22, that is, the surface layer portion of the light incident central region on the excitation light incident side (hereinafter, also referred to as the "central surface layer portion") locally generates heat and becomes high in temperature. The heat generated in the central surface layer portion is transferred to the central portion of the thermal diffusion layer 23 (specifically, the portion immediately above the central surface layer portion (light incident central region) of the thermal diffusion layer 23). In the thermal diffusion layer 23, the heat is conducted outward in the direction along the thermal diffusion layer 23, that is, toward the peripheral side surface of the thermal diffusion layer 23. The heat thus conducted to the peripheral portion of the central portion of the thermal diffusion layer 23 is transferred to the heat dissipation substrate 31 via the peripheral portion of the central surface layer portion of the fluorescent light-emitting layer 22 (a portion which is not a high-temperature portion) and the high thermal conductive layer 32, and is discharged in the heat dissipation substrate 31.

As described above, in the fluorescent light source device 10 of the present invention, the fluorescent light-emitting layer 22 is sandwiched between the thermal diffusion layer 23 and the high thermal conductive layer 32. Therefore, even when heat is locally generated by the excitation light incident on a partial region in the adjacent portion immediately below the partial region of the fluorescent light-emitting layer 22 on the one surface on the side where the excitation light is incident, the heat is diffused by being transferred to the thermal diffusion layer 23, and is efficiently transferred to the heat dissipation substrate 31 through the peripheral portion of the immediately blow-adjacent portion and the high thermal conductive layer 23. That is, since a heat discharge path extending from the thermal diffusion layer 23 toward the high thermal conductive layer 32 is formed in the peripheral portion of the portion where heat is generated by the incident excitation light in the fluorescent light-emitting layer 22, even if the heat dissipation substrate 31 is disposed on the side opposite to the excitation light incident side of the fluorescent light-emitting layer 22, heat generated in the fluorescent light-emitting layer 22 by the irradiation of excitation light can be efficiently transferred to the heat dissipation substrate 31 and discharged. As a result, it is possible to suppress the occurrence of temperature quenching in the fluorescent light-emitting layer 22.

Therefore, according to the fluorescent light source device 10 of the present invention, even when the incident power of the excitation light (excitation energy of the excitation light) is large, it is possible to suppress the occurrence of temperature quenching in the fluorescent light-emitting layer 22, and so a high fluorescence luminous flux (fluorescent light quantity) can be obtained, and as a result, it is possible to stably obtain a high luminous efficiency. Specifically, as will be apparent from the experimental examples described later, a fluorescent light quantity of 1.2 times or more can be obtained as compared to a configuration in which the thermal diffusion layer 23 is not provided to the fluorescent plate 21.

In addition, according to the configuration in which the material for forming the fluorescent light-emitting layer and the material for forming the thermal diffusion layer contain $Al_2O_3$ and the difference in coefficient of linear thermal expansion thereof is not more than $1 \times 10^{-6}$/K, the fluorescent light-emitting layer 22 and the thermal diffusion layer 23 can be bonded by optical contact by heat treatment at, for example, 800 to 1200° C., and so the obtained fluorescent plate can have a high bonding strength between the fluorescent light-emitting layer and the thermal diffusion layer.

Further, in the fluorescent light source device 10, since the fluorescent plate 21 is provided with the periodic structure body layer 25, it is not necessary to form the thermal diffusion layer 23 with a periodic structure body. This facilitates formation of the periodic structure body 27 on the excitation light receiving surface of the fluorescent plate 21.

Although the embodiments of the present invention have been described above, the present invention is not limited to the above-described embodiments, and various modifications may be made thereon.

For example, the fluorescent plate preferably has a periodic structure body layer from the viewpoint of ease of production, but may have a periodic structure formed on the front surface of the thermal diffusion layer without providing a periodic structure body layer. That is, the periodic structure body may be formed of a thermal diffusion layer. In the thermal diffusion layer provided with the periodic structure body, the periodic structure body is formed by an etching process.

Figure 3:
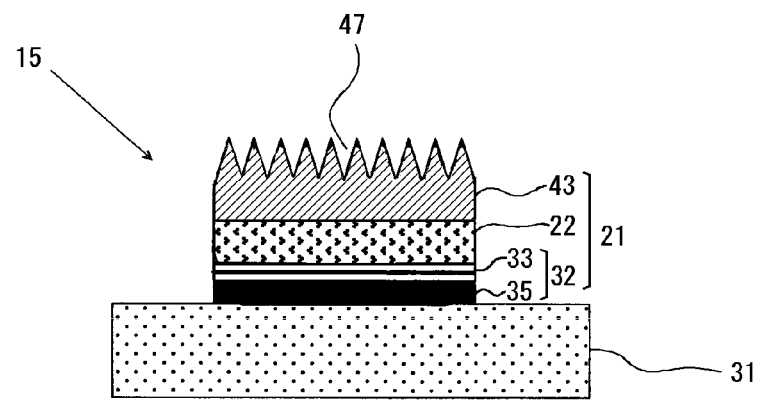
FIG. 3 is an explanatory diagram illustrating a configuration of a fluorescent light-emitting member in another example of the fluorescent light source device of the present invention.
Figure 4:
FIG. 4 is an explanatory diagram illustrating a configuration of a conventional fluorescent light source device.
Figure 4:
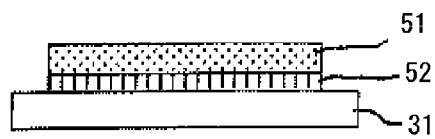

Specifically, as illustrated in FIG. 3, the fluorescent plate may have the same configuration as that of the fluorescent plate 21 constituting the fluorescent light source device 10 according to FIG. 1 except that the periodic structure body layer is not provided, the front surface of the thermal diffusion layer 43 serves as an excitation light incident surface, and a periodic structure body 47 is provided on the front surface of the thermal diffusion layer 43, in the fluorescent plate 21 constituting the fluorescent light source device 10 according to FIG. 1.

The periodic structure body is not limited to a configuration in which a plurality of convex portions are periodically arranged, and may be a configuration in which a plurality of columnar holes are periodically arranged, or may be a configuration in which a plurality of columnar holes are periodically arranged and a plurality of convex portions are periodically arranged.

The structure of the entire fluorescent light source device is not limited to that illustrated in FIG. 1, and various configurations may be adopted. For example, the fluorescent light source device according to FIG. 1 uses light from a single excitation light source (for example, a laser diode), but may be an aspect in which a plurality of excitation light sources are provided, a condenser lens is disposed in front of the fluorescent plate, and condensed light is irradiated to the fluorescent plate. Further, the excitation light is not limited to the laser light of a laser diode, and the light by various kinds of light sources may be adopted as long as it emits light capable of exciting the fluorescent plate (specifically, the fluorescent material constituting the fluorescent plate). Here, as the excitation light source, a light source that emits light having an appropriate wavelength in accordance with the type of the fluorescent material constituting the fluorescent plate (fluorescent light-emitting layer) or the like may be adopted, and a light source that emits light having a wavelength of 445 to 465 nm, for example, may be adopted.

Hereinafter, experimental examples conducted to confirm the operation and effect of the present invention will be described.

EXPERIMENTAL EXAMPLE 1

A fluorescent light-emitting member having the configuration illustrated in FIG. 1 (hereinafter also referred to as a "fluorescent light-emitting member (1)") was produced in the following manner.

The following fluorescent light-emitting layer material and thermal diffusion layer material were produced. Fluorescent light-emitting layer material:

Material: polycrystalline material formed of $Al_2O_3$ (50%)/YAG (doping amount of activating material (Ce) in YAG: 0.5 mol %, porosity: not more than 0.5%, thermal conductivity: 20 W/(m·K), coefficient of linear thermal expansion: $8.6 \times 10^{-6}$/K, refractive index: 1.83), thickness: 0.10 mm, surface roughness Ra of the surface (smooth surface): 0.3 nm, exposed area ratio of $Al_2O_3$ in the surface (smooth surface): 63% Thermal diffusion layer material:

Material: Sapphire (monocrystalline material, thermal conductivity: 42 W/(m·K), coefficient of linear thermal expansion: $7.7 \times 10^{-6}$/K, refractive index: 1.76), thickness: 0.1 mm, surface roughness Ra of surface (smooth surface): 0.3 nm, reciprocal ($1/(t \times \lambda)$) of the product of thickness (t) and thermal conductivity ($\lambda$): 119 K/W The above-mentioned fluorescent light-emitting layer material and thermal diffusion layer material were stacked so that their smooth surfaces were in close contact with each other, and the stacked body was subjected to a heat treatment under an atmospheric pressure environment and a condition of a temperature of 1000° C. or higher, thereby producing a laminate in which the thermal diffusion layer was directly bonded to the surface of the fluorescent light-emitting layer. Observation of the obtained laminate revealed no delamination between the fluorescent light-emitting layer and the thermal diffusion layer. The bonding strength between the fluorescent light-emitting layer and the thermal diffusion layer in the obtained laminate was measured by the following method, and was found to be 1.7 J/m².

In addition, a sputtered film made of zirconia was formed on the surface of the thermal diffusion layer, and an uneven structure was formed on the surface of the sputtered film by using a nanoimprint method and a dry etching process, thereby forming a periodic structure body layer. The specifications of the obtained periodic structure body layer are as follows.

Periodic Structure Body Layer:

Material: Zirconia, shape of periodic structure body: height (h) of convex portion=360 nm, period (d)=460 nm, aspect ratio (h/d)=0.6, thickness of base portion (thickness other than convex portion): 360 nm In the following manner, a high thermal conductive layer formed of a light reflection layer and a bonding layer was formed on the back surface of the fluorescent light-emitting layer, and a heat dissipation substrate was bonded to the obtained bonding layer.

Ag or Al serving as a light reflection layer was vapor-deposited on the fluorescent light-emitting layer, and Cr and Ni were vapor-deposited or plated to form a protective film in order to prevent oxidation or sulfidation of the vapor deposited film, thereby forming a light reflection layer. A bonding layer was formed on the protective film in the light reflection layer by solder and bonded to the heat dissipation substrate.

Specifications of the obtained high thermal conductive layer and heat dissipation substrate are as follows.

High thermal conductive layer:

Light reflection film: reflection increased silver film (thermal conductivity: 429 W/(m·K)), thickness: 150 nm Bonding member: AuSn solder (thermal conductivity: 60 W/(m·K)), thickness: 15 μm Heat Dissipation Substrate:

Material: Cu, thickness: 2 mm

In addition, a comparative fluorescent light-emitting member (hereinafter also referred to as "comparative fluorescent light-emitting member (1)") having the same configuration as that of the fluorescent light-emitting member (1) except that a thermal diffusion layer is not provided in the fluorescent light-emitting member (1) was produced.

The produced fluorescent light-emitting member (1) and comparative fluorescent light-emitting member (1) were irradiated with excitation laser light to the central region of the front surface of the fluorescent plate (the front surface of the periodic structure body layer), and the fluorescent output quantity on the surface was measured. Then, on the basis of the obtained measured value of the fluorescent output quantity, the ratio of the fluorescent output quantity of the fluorescent light-emitting member (1) (hereinafter also referred to as the "fluorescence output improvement ratio") when the fluorescent output quantity of the comparative fluorescent light-emitting member (1) is set to 1 as a reference was calculated, and found to be 1.56.

EXPERIMENTAL EXAMPLE 2

A fluorescent light-emitting member (hereinafter also referred to as "fluorescent light-emitting member (2)") having the same configuration as that of the fluorescent light-emitting member (1) except that the thickness of the thermal diffusion layer was 0.33 mm in the fluorescent light-emitting member (1) of Experimental Example 1 was produced. In the obtained fluorescent light-emitting member (2), the value of the reciprocal ($1/(t \times \lambda)$) of the product of the thickness (t) and the thermal conductivity ($\lambda$) of the thermal diffusion layer was 72 K/W.

With respect to the resulting fluorescent light-emitting member (2), the ratio of the fluorescent output quantity of the fluorescent light-emitting member (2) (fluorescence output improvement ratio) when the fluorescent output quantity of the comparative fluorescent light-emitting member (1) is set to 1 as a reference was calculated by the same method as that used in Experimental Example 1, and was found to be 1.62.

EXPERIMENTAL EXAMPLE 3

A fluorescent light-emitting member (hereinafter also referred to as "fluorescent light-emitting member (3)") having the same configuration as that of the fluorescent light-emitting member (1) except that the thickness of the thermal diffusion layer was 0.60 mm in the fluorescent light-emitting member (1) of Experimental Example 1 was produced. In the obtained fluorescent light-emitting member (3), the value of the reciprocal ($1/(t \times \lambda)$) of the product of the thickness (t) and the thermal conductivity ($\lambda$) of the thermal diffusion layer was 40 K/W.

With respect to the resulting fluorescent light-emitting member (3), the ratio of the fluorescent output quantity of the fluorescent light-emitting member (3) (fluorescence output improvement ratio) when the fluorescent output quantity of the comparative fluorescent light-emitting member (1) is set to 1 as a reference was calculated by the same method as that used in Experimental Example 1, and was found to be 1.74.

From the results of these Experimental Examples 1 to 3, it was confirmed that, in a fluorescent light source device including a fluorescent plate provided with a periodic structure body on the excitation light incident side and a heat dissipation substrate disposed on the other surface side opposite to one surface on the excitation light incident side of the fluorescent plate, the provision of a thermal diffusion layer on the excitation light incident side of the fluorescent plate could show a high fluorescence output (fluorescent light quantity). That is, it was confirmed that high luminous efficiency could be obtained by the fluorescent light source device of the present invention. Further, in particular, when the value of the reciprocal ($1/(t \times \lambda)$) of the product of the thickness (t) and the thermal conductivity ($\lambda$) falls within the range of 10 to 350 K/W, it was confirmed that a higher fluorescence output (fluorescent light quantity) of 1.2 times or more could be obtained as compared to the fluorescent light source device without a thermal diffusion layer.

EXPERIMENTAL EXAMPLE 4

A laminate of a fluorescent light-emitting layer material and a thermal diffusion layer material was produced in the same manner except that the fluorescent light-emitting layer material was changed to one having the following specification in Experimental Example 1.

Fluorescent Light-Emitting Layer Material:

Material: polycrystalline material formed of $Al_2O_3$ (60%)/YAG (doping amount of activating material (Ce) in YAG: 0.5 mol %, porosity: not more than 0.5%, thermal conductivity: 22 W/(m·K), coefficient of linear thermal expansion: $6.2 \times 10^{-6}$/K, refractive index: 1.78), thickness: 0.10 mm, surface roughness Ra of the surface (smooth surface): 0.3 nm, exposed area ratio of $Al_2O_3$ in the surface (smooth surface): 77%

Observation of the obtained laminate revealed no delamination between the fluorescent light-emitting layer and the thermal diffusion layer. The bonding strength between the fluorescent light-emitting layer and the thermal diffusion layer in the obtained laminate was measured in the same manner as in Experimental Example 1, and was found to be 1.83 $J/m^2$.

EXPERIMENTAL EXAMPLE 5

A laminate of a fluorescent light-emitting layer material and a thermal diffusion layer material was produced in the same manner except that the fluorescent light-emitting layer material was changed to one having the following specification in Experimental Example 1.

Fluorescent Light-Emitting Layer Material:

Material: polycrystalline material formed of $Al_2O_3$ (75%)/YAG (doping amount of activating material (Ce) in YAG: 0.5 mol %, porosity: not more than 0.5%, thermal conductivity: 25 W/(m·K), coefficient of linear thermal expansion: $6.05 \times 10^{-6}$/K, refractive index: 1.76), thickness: 0.10 mm, surface roughness Ra of the surface (smooth surface): 0.3 nm, exposed area ratio of $Al_2O_3$ in the surface (smooth surface): 98%

Observation of the obtained laminate revealed no delamination between the fluorescent light-emitting layer and the thermal diffusion layer. The bonding strength between the fluorescent light-emitting layer and the thermal diffusion layer in the obtained laminate was measured in the same manner as in Experimental Example 1, and was found to be 2.01 $J/m^2$.

COMPARATIVE EXPERIMENTAL EXAMPLE

A laminate of a fluorescent light-emitting layer material and a thermal diffusion layer material was produced in the same manner except that the fluorescent light-emitting layer material was changed to one having the following specification in Experimental Example 1.

Fluorescent Light-Emitting Layer Material:

Material: polycrystalline material formed of $Al_2O_3$ (40%)/YAG (doping amount of activating material (Ce) in YAG: 0.5 mol %, porosity: not more than 0.5%, thermal conductivity: 17 W/(m·K), coefficient of linear thermal expansion: $6.4 \times 10^{-6}$/K, refractive index: 1.79), thickness: 0.10 mm, surface roughness Ra of the surface (smooth surface): 0.3 nm, exposed area ratio of $Al_2O_3$ in the surface (smooth surface): 49%

Observation of the obtained laminate revealed delamination between the fluorescent light-emitting layer and the thermal diffusion layer. The bonding strength between the fluorescent light-emitting layer and the thermal diffusion layer in the obtained laminate was measured in the same manner as in Experimental Example 1, and was found to be 1.58 $J/m^2$.

REFERENCE SIGNS LIST 10 fluorescent light source device
11 excitation light source
15 fluorescent light-emitting member
18 collimator lens
21 fluorescent plate
22 fluorescent light-emitting layer
23 thermal diffusion layer
25 periodic structure body layer
26 base portion
27 periodic structure body
28 convex portion
31 heat dissipation substrate
32 high thermal conductive layer
33 light reflection layer
35 bonding layer
43 thermal diffusion layer
47 periodic structure body
51 fluorescent plate
52 bonding portion

The invention claimed is:

1. A fluorescent light source device comprising a fluorescent plate which has a fluorescent light-emitting layer formed of a polycrystalline material and in which a periodic structure body is formed on an excitation light incident side of the fluorescent light-emitting layer, wherein
   the fluorescent plate has a thermal diffusion layer which is directly bonded to a front surface of the fluorescent light-emitting layer on the excitation light incident side and has a thermal conductivity larger than that of the fluorescent light-emitting layer, and a high thermal conductive layer provided on a back surface of the fluorescent light-emitting layer opposite to the excitation light incident side,
   the high thermal conductive layer is formed of a light reflection layer and a bonding layer made of a metal,
   the fluorescent plate is provided so as to cover a part of a surface of a heat dissipation substrate disposed on a side of the high thermal conductive layer,
   a material for forming the fluorescent light-emitting layer and a material for forming the thermal diffusion layer contain $Al_2O_3$, and a difference in coefficient of linear thermal expansion between the material for forming the fluorescent light-emitting layer and the material for forming the thermal diffusion layer is not more than $1 \times 10^{-6}$/K,
   the fluorescent light-emitting layer has an exposed area ratio of $Al_2O_3$ of not less than 50% in a bonding surface with the thermal diffusion layer and wherein the light reflection layer is made of silver and the thermal conductivity of the material for forming the bonding layer is 40 to 60 W/(m·K).

2. The fluorescent light source device according to claim 1, wherein a surface roughness of each surface of the fluorescent light-emitting layer and the thermal diffusion layer bonded to each other is not less than 0.01 nm and not more than 1 nm.

3. The fluorescent light source device according to claim 2, wherein the material for forming the fluorescent light-emitting layer is a polycrystalline material of $Al_2O_3$ and an inorganic fluorescent material.

4. The fluorescent light source device according to claim 3, wherein the material for forming the thermal diffusion layer is sapphire.

5. The fluorescent light source device according to claim 2, wherein the material for forming the thermal diffusion layer is sapphire.

6. The fluorescent light source device according to claim 1, wherein the material for forming the thermal diffusion layer is sapphire.

7. The fluorescent light source device according to claim 1, wherein materials for forming the thermal diffusion layer and for forming the high thermal conductive layer have a higher thermal conductivity than that of a material for forming the fluorescent light-emitting layer.

8. The fluorescent light source device according to claim 1, wherein a material for forming the high thermal conductive layer has a higher thermal conductivity than that of a material for forming the thermal diffusion layer.

9. The fluorescent light source device according to claim 1, wherein, when a thickness of the thermal diffusion layer is t [m] and a thermal conductivity of a material for forming the thermal diffusion layer is $\lambda$[W/(m·K)], a value of a reciprocal $(1/(t \times \lambda))$ of a product of the thickness and the thermal conductivity of the material for forming the thermal diffusion layer satisfies 10 to 350 (K/W).

10. A process for producing the fluorescent light source device according to claim 1, comprising:
    preparing the fluorescent light-emitting layer material having a surface which is to be bonded to the thermal diffusion layer and has a surface roughness of not less than 0.01 nm and not more than 1 nm, and a thermal diffusion layer material having a surface which is to be bonded to the fluorescent light-emitting layer and has a surface roughness of not less than 0.01 nm and not more than 1 nm; and
    a step of bonding the fluorescent light-emitting layer material and the thermal diffusion layer material by optical contact in a state where surfaces of them are in close contact with each other.

11. The process for producing the fluorescent light source device according to claim 10, wherein a surface roughness of each surface of the fluorescent light-emitting layer and the thermal diffusion layer bonded to each other is not less than 0.01 nm and not more than 1 nm.

12. The process for producing the fluorescent light source device according to claim 11, wherein the material for forming the thermal diffusion layer is sapphire.

13. The process for producing the fluorescent light source device according to claim 11, wherein the material for forming the fluorescent light-emitting layer is a polycrystalline material of $Al_2O_3$ and an inorganic fluorescent material.

14. The process for producing the fluorescent light source device according to claim 13, wherein the material for forming the thermal diffusion layer is sapphire.

15. The process for producing the fluorescent light source device according to claim 10, wherein the material for forming the thermal diffusion layer is sapphire.

16. The process for producing the fluorescent light source device according to claim 10, wherein materials for forming the thermal diffusion layer and for forming the high thermal conductive layer have a higher thermal conductivity than that of a material for forming the fluorescent light-emitting layer.

17. The process for producing the fluorescent light source device according to claim 10, wherein a material for forming the high thermal conductive layer has a higher thermal conductivity than that of a material for forming the thermal diffusion layer.

18. The process for producing the fluorescent light source device according to claim 10, wherein, when a thickness of the thermal diffusion layer is t [m] and a thermal conductivity of a material for forming the thermal diffusion layer is $\lambda$[W/(m·K)], a value of a reciprocal $(1/(t \times \lambda))$ of a product of the thickness and the thermal conductivity of the material for forming the thermal diffusion layer satisfies 10 to 350 (K/W).

19. A process for producing the fluorescent light source device according to claim 1, comprising:
    preparing the fluorescent light-emitting layer material having a surface which is to be bonded to the thermal diffusion layer and has a surface roughness of not less than 0.01 nm and not more than 1 nm, and a thermal diffusion layer material having a surface which is to be bonded to the fluorescent light-emitting layer and has a surface roughness of not less than 0.01 nm and not more than 1 nm; and
    a step of bonding the fluorescent light-emitting layer material and the thermal diffusion layer material to each other by heating to 800 to 1200° C. in a state where surfaces of them are in close contact with each other.

20. The process for producing the fluorescent light source device according to claim 19, wherein a surface roughness of each surface of the fluorescent light-emitting layer and the thermal diffusion layer bonded to each other is not less than 0.01 nm and not more than 1 nm.

21. The process for producing the fluorescent light source device according to claim 20, wherein the material for forming the thermal diffusion layer is sapphire.

22. The process for producing the fluorescent light source device according to claim 20, wherein the material for forming the fluorescent light-emitting layer is a polycrystalline material of $Al_2O_3$ and an inorganic fluorescent material.

23. The process for producing the fluorescent light source device according to claim 22, wherein the material for forming the thermal diffusion layer is sapphire.

24. The process for producing the fluorescent light source device according to claim 19, wherein the material for forming the thermal diffusion layer is sapphire.

25. The process for producing the fluorescent light source device according to claim 19, wherein materials for forming the thermal diffusion layer and for forming the high thermal conductive layer have a higher thermal conductivity than that of a material for forming the fluorescent light-emitting layer.

26. The process for producing the fluorescent light source device according to claim 19, wherein a material for forming the high thermal conductive layer has a higher thermal conductivity than that of a material for forming the thermal diffusion layer.

27. The process for producing the fluorescent light source device according to claim 19, wherein, when a thickness of the thermal diffusion layer is t [m] and a thermal conductivity of a material for forming the thermal diffusion layer is $\lambda$[W/(m·K)], a value of a reciprocal $(1/(t \times \lambda))$ of a product of the thickness and the thermal conductivity of the material for forming the thermal diffusion layer satisfies 10 to 350 (K/W).

* * * * *